(12) United States Patent
Chen et al.

(10) Patent No.: US 11,977,805 B2
(45) Date of Patent: May 7, 2024

(54) SYSTEMS AND METHODS FOR DISPLAYING FACILITY INFORMATION

(71) Applicant: Honeywell International Inc., Charlotte, NC (US)

(72) Inventors: Henry Chen, Beijing (CN); Weilin Zhang, Beijing (CN); Peter Lau, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/397,091

(22) Filed: Aug. 9, 2021

(65) Prior Publication Data

US 2021/0373836 A1 Dec. 2, 2021

Related U.S. Application Data

(63) Continuation of application No. 14/938,694, filed on Nov. 11, 2015, now abandoned.

(30) Foreign Application Priority Data

Nov. 12, 2014 (AU) .................................. 2014904537

(51) Int. Cl.
| | |
|---|---|
| *G06F 3/14* | (2006.01) |
| *G06Q 10/00* | (2023.01) |
| *G06T 3/4038* | (2024.01) |
| *G06T 11/20* | (2006.01) |
| *G09G 5/34* | (2006.01) |

(52) U.S. Cl.
CPC .............. *G06F 3/1423* (2013.01); *G06F 3/14* (2013.01); *G06Q 10/00* (2013.01); *G06T 3/4038* (2013.01); *G06T 11/206* (2013.01); *G09G 5/34* (2013.01); *G09G 2340/04* (2013.01); *G09G 2370/022* (2013.01)

(58) Field of Classification Search
None
See application file for complete search history.

(56) References Cited

U.S. PATENT DOCUMENTS

| | | | |
|---|---|---|---|
| 5,295,062 | A | 3/1994 | Fukushima |
| 5,736,977 | A | 4/1998 | Hughes |
| 7,646,307 | B2 | 1/2010 | Plocher et al. |
| 8,352,176 | B2 | 1/2013 | Kaldewey et al. |
| 8,532,962 | B2 | 9/2013 | Zhang et al. |
| 8,843,350 | B2 | 9/2014 | Jacobi et al. |

(Continued)

*Primary Examiner* — Saptarshi Mazumder
(74) *Attorney, Agent, or Firm* — Seager, Tufte & Wickhem, LLP (57) ABSTRACT

The present disclosure relates to methods for displaying facility information. One such method includes causing a client terminal to render on-screen floorplan data at a desired position and resolution, wherein the floorplan data is defined by a plurality of scalable resolution independent vector images, each resolution independent vector image representing a physical space in a facility. As set of rules are executed thereby to apply determined visual characteristics to one or more of the vector images, wherein each of the one or more vector images is associated with a data point in a building management system, and wherein for a given vector image the set of rules defines a relationship between observed data point values and visual characteristics to be displayed.

15 Claims, 10 Drawing Sheets

(56) References Cited

U.S. PATENT DOCUMENTS

| | | |
|---|---|---|
| 9,134,714 B2 | 9/2015 | Hoffknecht et al. |
| 2006/0239645 A1* | 10/2006 | Curtner .............. G08B 13/1968 |
| | | 348/E7.086 |
| 2007/0206001 A1 | 9/2007 | Mckay |
| 2008/0109159 A1* | 5/2008 | Shi ........................ G01C 21/32 |
| | | 707/E17.031 |
| 2008/0183483 A1* | 7/2008 | Hart ........................ G06F 30/13 |
| | | 703/1 |
| 2009/0057427 A1* | 3/2009 | Geadelmann .......... G05B 15/02 |
| | | 707/999.009 |
| 2010/0017739 A1* | 1/2010 | Han ........................ H04L 67/75 |
| | | 715/234 |
| 2011/0029341 A1 | 2/2011 | Muse et al. |
| 2011/0087988 A1* | 4/2011 | Ray ........................ G06Q 50/16 |
| | | 715/771 |
| 2012/0044138 A1* | 2/2012 | Lee ........................ G06F 3/0484 |
| | | 715/769 |
| 2012/0297346 A1 | 11/2012 | Hoffknecht et al. |
| 2014/0033069 A1 | 1/2014 | Chegini et al. |
| 2014/0207774 A1 | 7/2014 | Walter et al. |
| 2014/0362112 A1 | 12/2014 | Morrison et al. |
| 2014/0365891 A1 | 12/2014 | Morrison et al. |
| 2014/0365896 A1 | 12/2014 | Morrison et al. |
| 2014/0365942 A1 | 12/2014 | Morrison et al. |
| 2014/0365976 A1 | 12/2014 | Morrison et al. |
| 2014/0365980 A1 | 12/2014 | Morrison et al. |
| 2015/0029214 A1 | 1/2015 | Kumagai |
| 2015/0317418 A1 | 11/2015 | Sankarapandian et al. |

* cited by examiner

SYSTEMS AND METHODS FOR DISPLAYING FACILITY INFORMATION

This is a continuation of co-pending U.S. patent application Ser. No. 14/938,694, filed on Nov. 11, 2015, and entitled SYSTEMS AND METHODS FOR DISPLAYING FACILITY INFORMATION, which claims priority to Australian Patent Application No. 2014904537, filed on Nov. 12, 2014, and entitled, SYSTEMS AND METHODS FOR DISPLAYING FACILITY INFORMATION, both of which are incorporated herein by reference.

FIELD OF THE INVENTION

The present invention relates broadly to building management, and more particularly to systems and methods for displaying facility information. Embodiments of the invention have been particularly developed for providing visualization indicative of the overall status of an HVAC system, and additionally to enable sharing of visually-defined HVAC performance data with non-technical users.

BACKGROUND

Any discussion of the prior art throughout the specification should in no way be considered as an admission that such prior art is widely known or forms part of common general knowledge in the field.

It is known to use overlie temperature information onto renderings of floorplan data within graphical user interfaces, for example using a layer-based approach. However, known approaches are limited in terms of the level of operational awareness they are able to convey.

SUMMARY

It is an object of the present invention to overcome or ameliorate at least one of the disadvantages of the prior art, or to provide a useful alternative.

One embodiment provides a method for displaying facility information, the method including:

maintaining access to a repository of floorplan data, wherein the floorplan data is defined by a plurality of scalable resolution independent vector images, each resolution independent vector image representing a physical space in a facility;

maintaining access to a database that associates a plurality of the vector images with data points defined in a building management system;

in response to a request from a client terminal, enabling the client terminal to render the floorplan data at a desired position and resolution; and configuring the client terminal to render each of the plurality of vector images with graphical characteristics determined by reference to the data points defined in the building management system.

One embodiment provides a method wherein the scalable resolution independent vector images include HTML5 Scalable Vector Graphics images.

One embodiment provides a method wherein, for a given vector image, the graphical characteristics determined by reference to a relationship between: (i) a measured temperature value at the represented physical space; and (ii) a defined temperature setpoint value defined for the represented physical space.

One embodiment provides a method wherein, for a given vector image, the graphical characteristics include a fill for the vector image.

One embodiment provides a method wherein the fill is characterized by a colour and/or pattern and/or opacity.

One embodiment provides a method wherein the fill is characterized by an alphanumeric information.

One embodiment provides a method including enabling a user to define video data representative of navigation of the rendered floorplan.

One embodiment provides a method including enabling the user to share the video data with a second user of a further client terminal.

One embodiment provides a method wherein configuring the client terminal to render each of the plurality of vector images with graphical characteristics determined by reference to the data points defined in the building management system includes configuring data binding between the client terminal and a remote data source that provides data indicative instructions to modify the graphical characteristics of one or more of the vector images.

One embodiment provides a method wherein configuring the client terminal to render each of the plurality of vector images with graphical characteristics determined by reference to the data points defined in the building management system includes instructing the client terminal to modify the graphical characteristics of one or more of the vector images in response to changes in the associated data points in the building management system.

One embodiment provides a method for displaying facility information, the method including:

causing a client terminal to render on-screen floorplan data at a desired position and resolution, wherein the floorplan data is defined by a plurality of scalable resolution independent vector images, each resolution independent vector image representing a physical space in a facility; and executing a set of rules thereby to apply determined visual characteristics to one or more of the vector images, wherein each of the one or more vector images is associated with a data point in a building management system, and wherein for a given vector image the set of rules defines a relationship between observed data point values and visual characteristics to be displayed.

One embodiment provides a method wherein the scalable resolution independent vector images include HTML5 Scalable Vector Graphics images.

One embodiment provides a method wherein, for a given vector image, the graphical characteristics determined by reference to a relationship between: (i) a measured temperature value at the represented physical space; and (ii) a defined temperature setpoint value defined for the represented physical space.

One embodiment provides a method wherein, for a given vector image, the graphical characteristics include a fill for the vector image.

One embodiment provides a method wherein the fill is characterized by a colour and/or pattern and/or opacity.

One embodiment provides a method wherein the fill is characterized by an alphanumeric information.

One embodiment provides a method including enabling a user to define video data representative of navigation of the rendered floorplan.

One embodiment provides a method including enabling the user to share the video data with a second user of a further client terminal.

One embodiment provides a non-transitory carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

One embodiment provides a method for displaying facility information. The method includes causing a client terminal to render on-screen floorplan data at a desired position and resolution, wherein the floorplan data is defined by a plurality of scalable resolution independent vector images, each resolution independent vector image representing a physical space in a facility. As set of rules are executed thereby to apply determined visual characteristics to one or more of the vector images, wherein each of the one or more vector images is associated with a data point in a building management system, and wherein for a given vector image the set of rules defines a relationship between observed data point values and visual characteristics to be displayed.

System Level Overview

Figure 1:
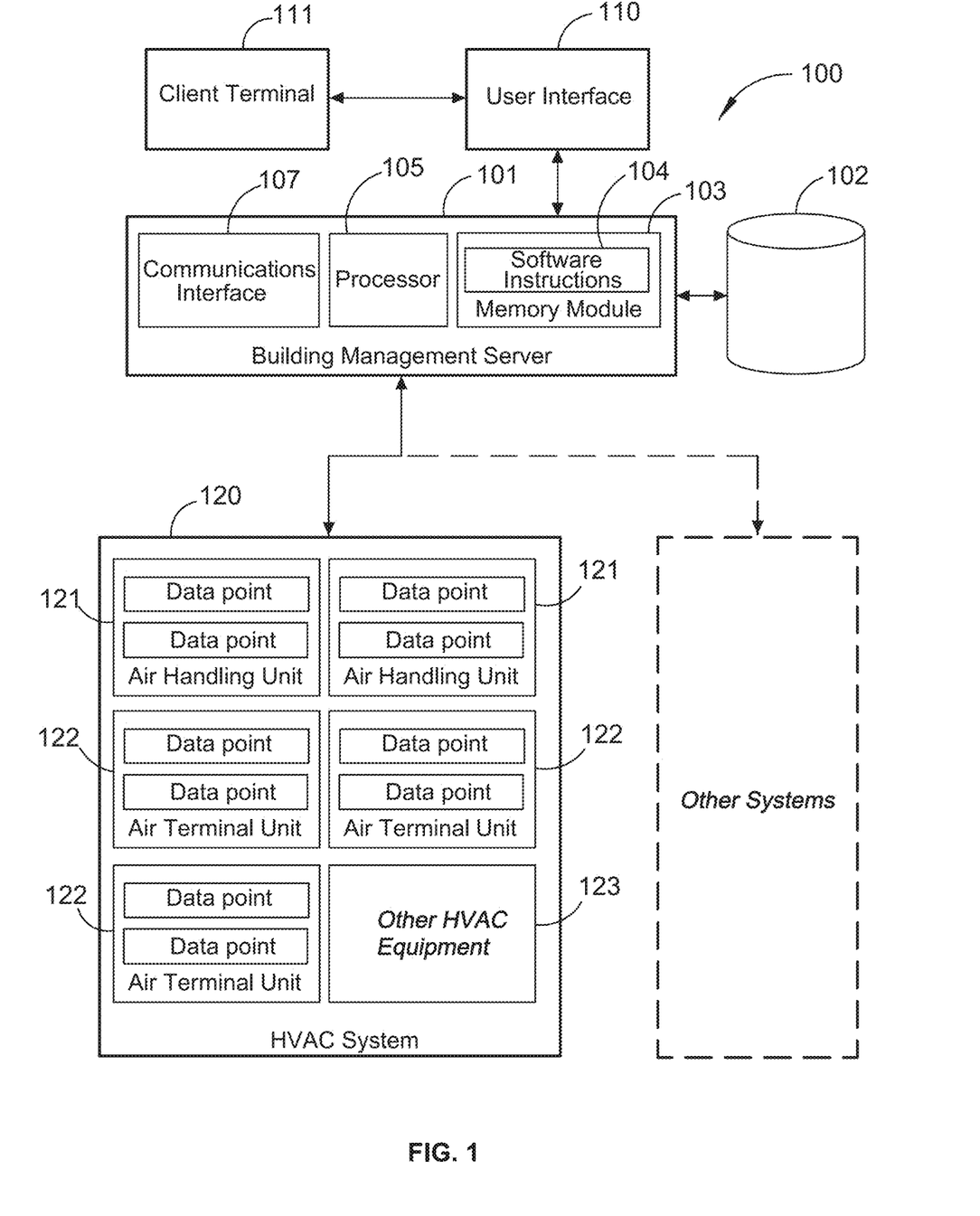
FIG. 1 schematically illustrates a system according to one embodiment.

FIG. 1 illustrates an arrangement according to one embodiment, referred to as a building management system (BMS) 100. It will be appreciated that this is a relative simplistic schematic illustration, intended to illustrate some key features and functionalities.

BMS 100 is defined by both hardware and software components. For example, BMS 100 includes a central BMS server 101 which operates in conjunction with a database 102. Server 101 includes a memory module 103 which maintains software instructions 104 executable on a processor 105, thereby to allow the server to perform various BMS functionalities. For example, these software instructions define some or all of a computer program product in the form of a BMS software application. BMS 101 includes communication interfaces 107 (such as Ethernet and other interfaces) for enabling communication with a plurality of building components, and with client terminals.

Although FIG. 1 illustrates server 101 as a single component, in some embodiments server 101 is defined by a plurality of distributed hardware and/or software components. Furthermore, various other IT components (such as routers, switches, etc) are omitted for the sake of simplicity. BMS server 101 is configured to communicate with a plurality of BMS components. For example, these may include a plurality of distributed hardware components that are identified (and functionally configured) as data points for the BMS. For example, data points may be configured via standard protocols such as OPC or BACNEt, or proprietary interfaces such as EBI NetAPI or SOA interfaces. In some embodiments there are multiple separate BMS servers.

Server 101 interacts with a user interface module 110. For example, the user interface module is preferably defined by a device (or collection of devices) configured to deliver web page data for rendering via a web browser application (for example a web server that delivers code such as HTML5 code) at a client terminal, such as exemplary client terminal 111 (which may be substantially any device able to communicate with user interface module 110 via the Internet or a local network), thereby to enable to the client terminal to render a user interface based on that web page data. The rendered user interface enables a user of client terminal 111 to access information and/or functionalities provided by BMS server 101. Although FIG. 1 indicates that data flow between client terminal 111 and BMS server 101 as routing via user interface module 110.

In the present example, BMS server 101 is configured to interact with data points in an HVAC system 120, and other systems. The other systems are not described in detail, with HVAC being used as a specific example for the purposes of the present disclosure. However, it will be appreciated how technologies and methodologies described herein may be applied in respect of data points from such other BMS server managed systems.

HVAC system 120 includes various pieces of equipment, including air handling units 121 and air terminal units 122, and other pieces of equipment 123. Each piece of equipment includes (or is at a practical level related to) none or more data points. These data points are individual inputs and outputs (binary and/or digital) which feed data values into BMS 100. It will be appreciated that the manner by which HVAC system 120 is illustrated is conceptual only.

Display of Enhanced Floorplan Data

Embodiments described herein make use of scalable vector graphics, for example using SVG within HTML5, thereby to define floorplan data that is renderable at a client terminal such as client terminal 111. A key point of distinction from conventional approaches is that spaces on the floorplan are represented with scalable and resolution independent vector images, with these vector images being associated with points in a building management system (also referred to as a building automation system).

One embodiment provides a method for displaying facility information, the method including: maintaining access to a repository of floorplan data, wherein the floorplan data is defined by a plurality of scalable resolution independent vector images. These include vector images wherein each resolution independent vector image represents a physical space in a facility, such as a room. The method additionally includes maintaining access to a database that associates a plurality of the vector images with data points defined in a building management system. In response to a request from a client terminal, the client terminal is enabled to render (for example in a web browser user interface) the floorplan data at a desired position and resolution. That is, the user is enabled to navigate through the floorplan data, for example by panning, zooming, or transitioning to a different one of a plurality of floors in a facility. The method additionally includes configuring the client terminal to render each of the plurality of vector images with graphical characteristics determined by reference to the data points defined in the building management system. For instance, the graphical characteristics may include fill characteristics, such as colour and/or pattern and/or opacity. Alphanumeric information (or other graphical information) may be applied as an alternative or in addition.

As noted embodiment provides a method wherein the scalable resolution independent vector images include HTML5 Scalable Vector Graphics images. However, various approaches may be used. The key is to provide a resolution independent floorplan, thereby to enable a user to quickly and efficiently navigate floor displays (via pan and zoom) whilst, in an efficient manner, displaying graphical attributes representing characteristics of spaces based on data defined in a BMS.

For the purpose of the present specification, the application of graphical characteristics to the scalable vector graphics is described by reference to a specific application of conveying temperature data in a facility. In this regard, a scalable vector graphic representing a given floorspace is associated with a data point that delivers a temperature value for this floorspace.

The graphical characteristic for the vector graphic may be defined based on, for example:

Actual temperature. For example a colour gradient is defined, with various colors, for example ranging from red, to light red, to white, to light blue, to dark blue, representing various actual temperatures.

Temperature exceptions. For example, one embodiment provides a method wherein, for a given vector image, the graphical characteristics determined by reference to a relationship between: (i) a measured temperature value at the represented physical space; and (ii) a defined temperature setpoint value defined for the represented physical space. In this regard, colours may be used to show whether a given region is warmer or cooler than its defined setpoint (and the extent of deviation).

In a general sense, a set of rules may be defined thereby to determine selection of graphical characteristics based on data point values. These may vary in complexity. In some embodiments a vector graphic is associated with a data point directly, in other cases it is associated with a data point by virtue of being associated with a rule that references that data point.

The manner by which BMS data is accessed thereby to apply graphical characteristics to vector graphics rendered in a web page varies between implementations. Examples include:

- A method wherein configuring the client terminal to render each of the plurality of vector images with graphical characteristics determined by reference to the data points defined in the building management system includes configuring data binding between the client terminal and a remote data source that provides data indicative instructions to modify the graphical characteristics of one or more of the vector images.
- A method wherein configuring the client terminal to render each of the plurality of vector images with graphical characteristics determined by reference to the data points defined in the building management system includes configuring data binding between the client terminal and a remote data source that provides data indicative instructions to modify the graphical characteristics of one or more of the vector images.

In either case, there is a form of data binding applied between objects in the user interface and data defined in a BMS system thereby to enable real time (or substantially real time) application of BMS data to rendered vector graphics, hence enabling a user to vie up to date building information via a floorplan which is able to be navigated (for example in terms of pan and zoom) in an efficient and effective manner.

Exemplary Method

Figure 2:
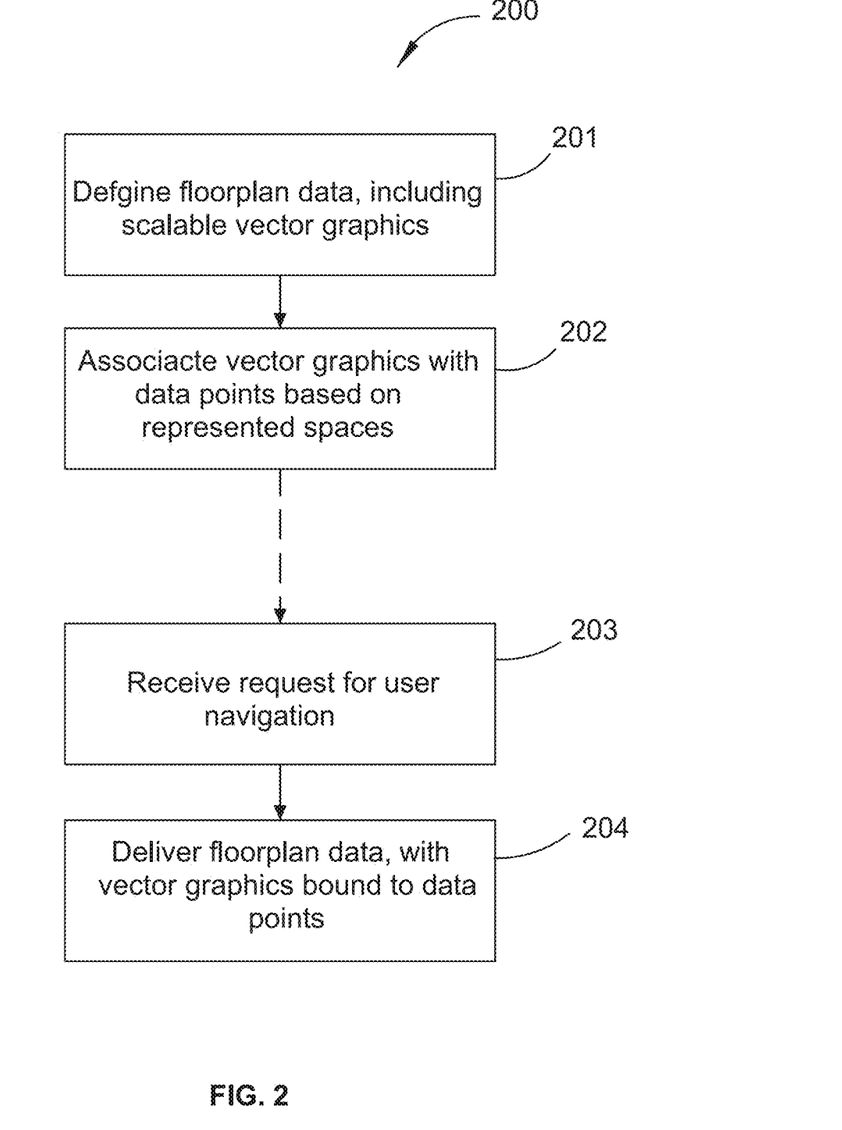
FIG. 2 illustrates a method according to one embodiment.

FIG. 2 illustrates an exemplary method 200 according to one embodiment.

Method 200 is split into two portions. A first portion is a configuration phase, defined by steps 201 and 202. These respectively include defining floorplan data, including scalable vector graphics for representing floor spaces, and associating the vector graphics with data points defined in a BMS. Based on a set of rules, this configured a user interface in which the floorplan is rendered to apply graphical characteristics to the vector graphics based on obtained values for their associated data points.

The second portion is an operational phase defined by steps 203 and 202, which is repeatedly performed each time a client terminal navigates to a page containing an object configured to render the floorplan data. At 203 a user navigates to such a page, and at 204 floorplan data is delivered with its vector graphics bound. Data point values are obtained and applied thereby to determine visual characteristics either by a server device (for example a server device that delivers the floorplan data) or by the client device (for example HTML code configures the client terminal to obtain data point values from specified network locations).

Video Export Functionalities

One embodiment provides a method including enabling a user to define video data representative of navigation of the rendered floorplan, and indicative of historical states of graphical characteristics of the floorplan. The user is enabled to share the video data with a second user of a further client terminal.

The user interface module delivers to the client terminal data that enables rendering of user interface components thereby to allow control over video creation and export functionalities. The user is enabled to set a historical capture time, and preferably a sample rate, and cause the interface to export a video (either by way of a file, or by way of a link to a file hosted on a server) which shows the floorplan (based on a user specified navigation portion) over the historical capture time, thereby to graphically illustrate fluctuations in temperatures within a facility.

Exemplary User Interface

FIG. 4A to FIG. 4G illustrates exemplary user interface components according to one embodiment.

Figure 4A:
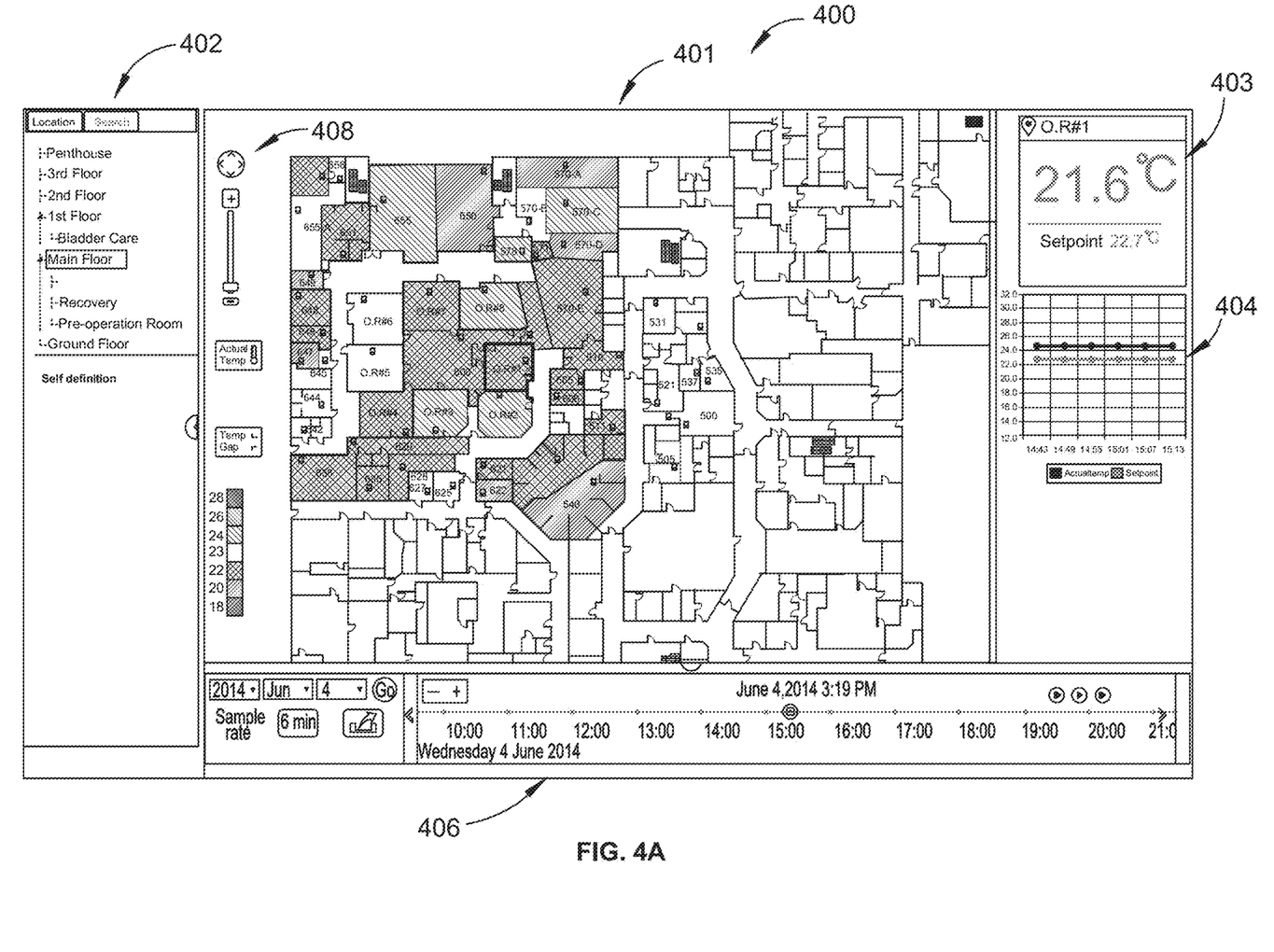
FIG. 4A to FIG. 4G illustrates exemplary user interface components.
Figure 4B:
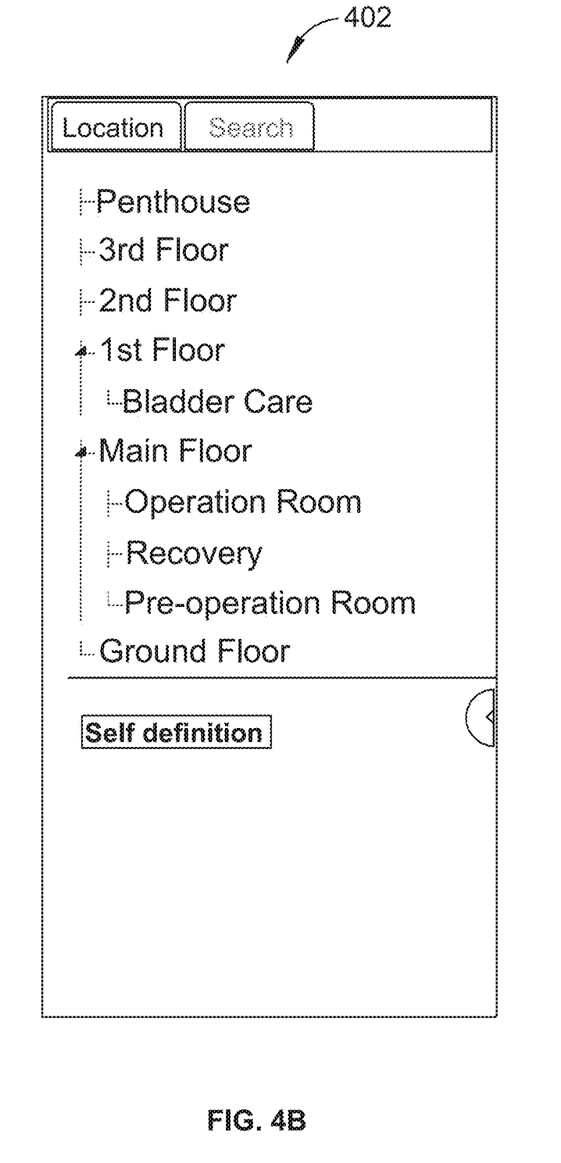
Figure 4C:
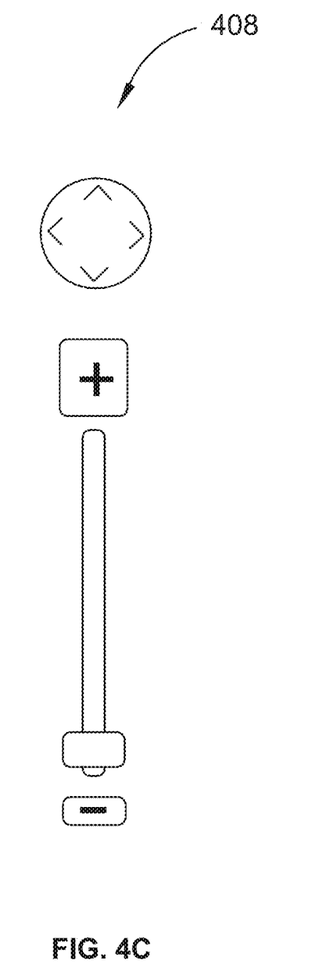

FIG. 4A provides an exemplary overall view, showing a user interface 400 rendered in a web browser. This includes a floorplan display object 401, which is configured to display floorplan data. Navigation tools 408 enable a user to navigate the floorplan in terms of pan and zoom. Secondary navigation controls 402 enable a user to navigate by reference to selecting discrete floors, or by selecting particular regions (for example defined by reference to floor spaces represented by scalable vector graphics in the floorplan).

In one embodiment, a user first selects a building (if there are multiple buildings available), for example using a drop down menu. Once a building is selected, its floors will be displayed in the left hierarchy tree within controls 402 (shown in more detail in FIG. 4B). The upper part lists all its floors and zones, the bottom part show the definition map, for example an overview map with multiple zones. When a user switches among floors and zones by clicking their name, their relevant floorplan (heat map) of the floor/zone will be displayed in the middle panel 401.

Figure 4D:
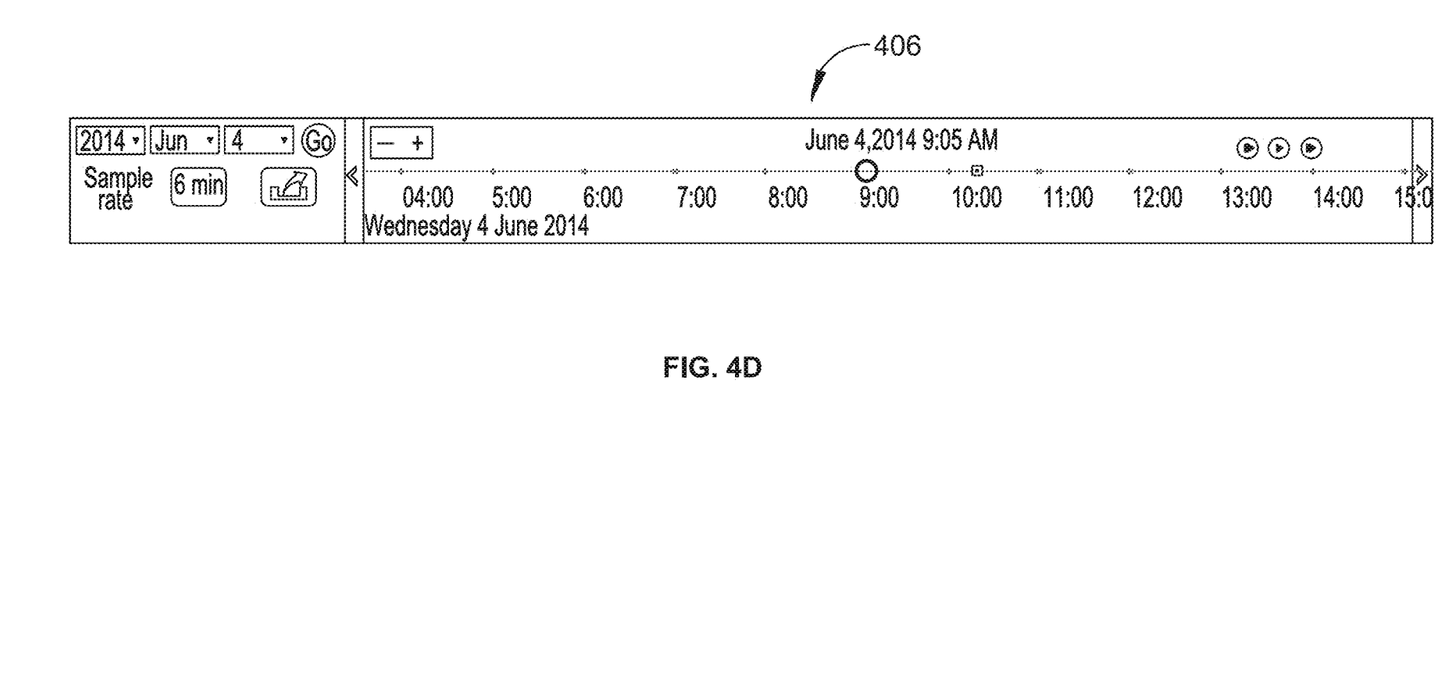
Figure 4E:
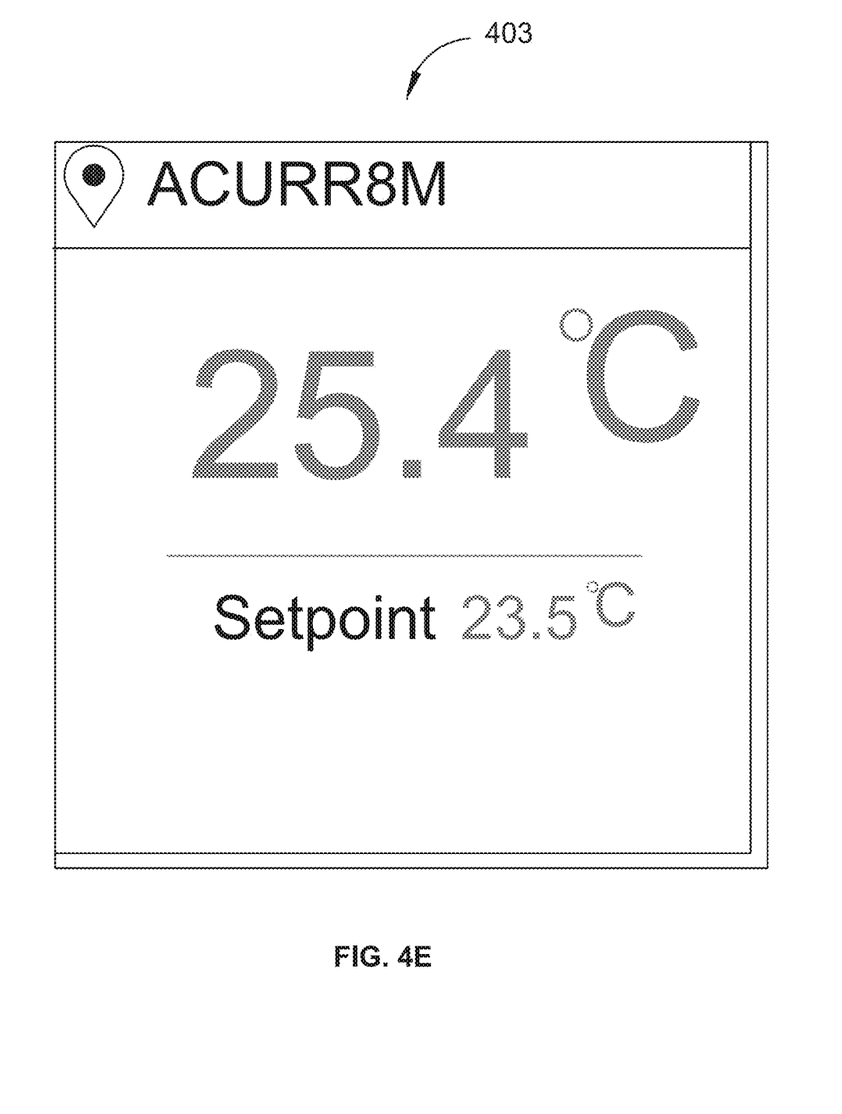
Figure 4F:
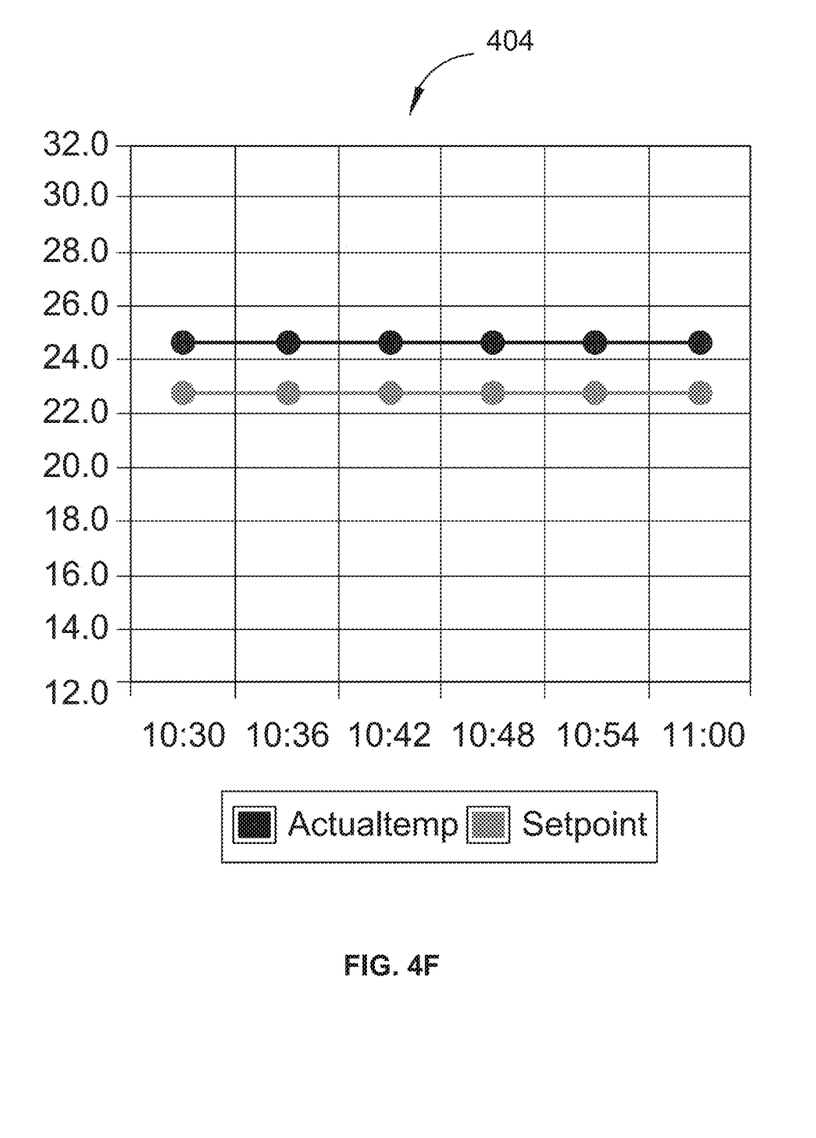
Figure 4G:
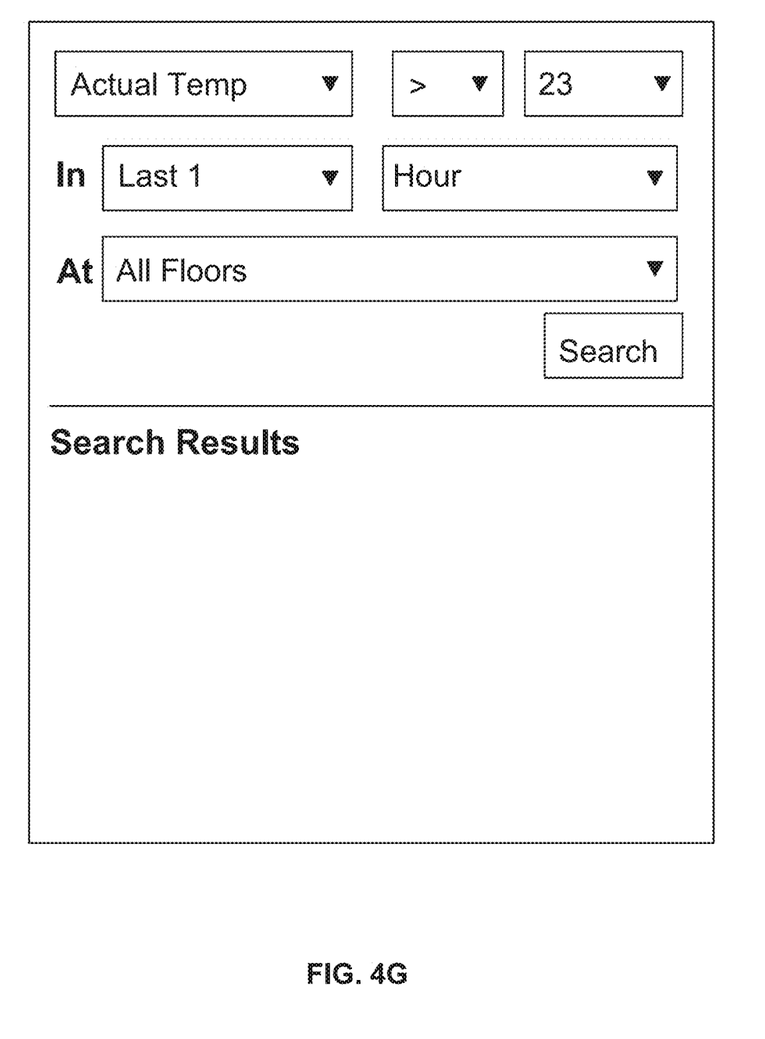

A search function is also provided, shown in FIG. 4G. This enables a user to navigate by reference to floor areas that meet search criteria, which may be defined by reference to temperature.

Objects 403 and 404 provide more detailed temperature information for a selected floorspace (selected by actions such as pointing and/or clicking). Object 403 shows an actual temperature and a setpoint, and in some embodiments provided functionality thereby to enable a user to adjust the setpoint. Object 404 shows a historical relationship between actual temperature and setpoint.

Timeline bar and video control 406, shown in more detail in FIG. 4D, allow a user to view heatmap data for a given time range. The user selects a date on the left hand side, and a time range using the timeline. The user is able to view a preview using playback controls, and adjust a simple rate. The user then selectively exports a video using an export button, thereby to enable third parties (for example non-technical users) to view temperature data for the selected date and time range. In some embodiments the user defines video characteristics using object 406 and then exports, in other embodiments the user records activity in the user interface, which is exported as a video file.

As context, in a typical scenario, an operator is sitting in the operation room and logs in to a service thereby to access the illustrated user interface. He receives a phone call from someone complaining that the temperature is too hot or too cold in a given room for the past two days. The operator navigates a floorplan view including that room and then clicks that zone or thermostat to show the graphical temperature trend diagram in objects 403 and 404. Then, the operator sets the sample rate (for example to 1 sample per minute) to play-back the history temperature value for that two days. The operator also can click the record button to get the video of his operations for potentially sending the evidence to that people, for example the complainant.

Exemplary Client-Server Framework

Figure 3:
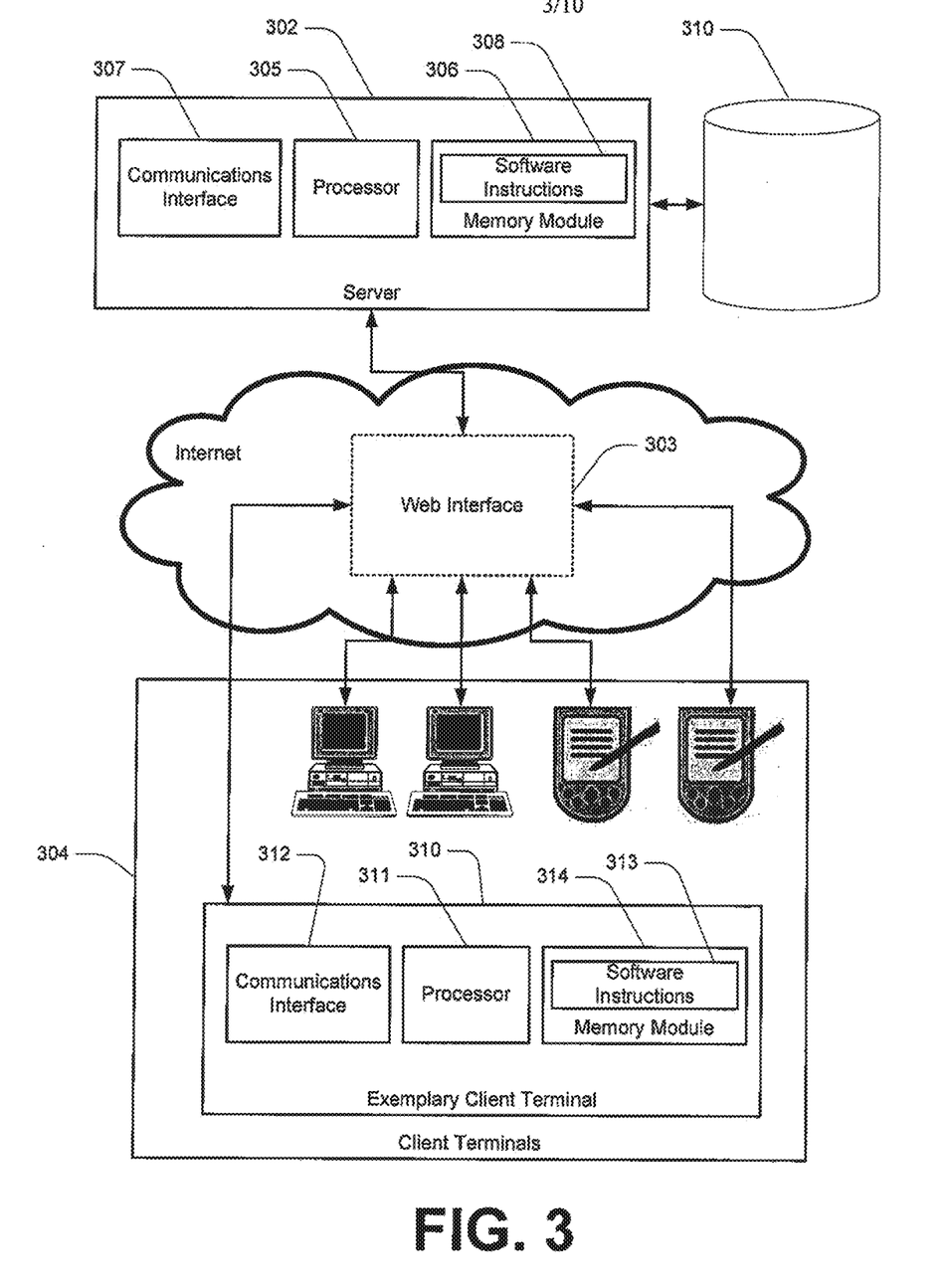
FIG. 3 illustrates a client-server framework leveraged by various embodiments.

In some embodiments, methods and functionalities considered herein are implemented by way of a server, as illustrated in FIG. 3. In overview, a web server 302 provides a web interface 303. This web interface is accessed by the parties by way of client terminals 304. In overview, users access interface 303 over the Internet by way of client terminals 304, which in various embodiments include the likes of personal computers, PDAs, cellular telephones, gaming consoles, and other Internet enabled devices.

Server 303 includes a processor 305 coupled to a memory module 306 and a communications interface 307, such as an Internet connection, modem, Ethernet port, wireless network card, serial port, or the like. In other embodiments distributed resources are used. For example, in one embodiment server 302 includes a plurality of distributed servers having respective storage, processing and communications resources. Memory module 306 includes software instructions 308, which are executable on processor 305.

Server 302 is coupled to a database 310. In further embodiments the database leverages memory module 306.

In some embodiments web interface 303 includes a website. The term "website" should be read broadly to cover substantially any source of information accessible over the Internet or another communications network (such as WAN, LAN or WLAN) via a browser application running on a client terminal. In some embodiments, a website is a source of information made available by a server and accessible over the Internet by a web-browser application running on a client terminal. The web-browser application downloads code, such as HTML code, from the server. This code is executable through the web-browser on the client terminal for providing a graphical and often interactive representation of the website on the client terminal. By way of the web-browser application, a user of the client terminal is able to navigate between and throughout various web pages provided by the website, and access various functionalities that are provided.

Although some embodiments make use of a website/browser-based implementation, in other embodiments proprietary software methods are implemented as an alternative. For example, in such embodiments client terminals 304 maintain software instructions for a computer program product that essentially provides access to a portal via which framework 100 is accessed (for instance via an iPhone app or the like).

In general terms, each terminal 304 includes a processor 311 coupled to a memory module 313 and a communications interface 312, such as an internet connection, modem, Ethernet port, serial port, or the like. Memory module 313 includes software instructions 314, which are executable on processor 311. These software instructions allow terminal 304 to execute a software application, such as a proprietary application or web browser application and thereby render on-screen a user interface and allow communication with server 302. This user interface allows for the creation, viewing and administration of profiles, access to the internal communications interface, and various other functionalities.

CONCLUSIONS AND INTERPRETATION

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A computer implemented method for displaying facility information on a display, the method including:
   maintaining electronic access to a repository of digital floorplan data, wherein the floorplan data is defined by a plurality of scalable resolution independent vector floorplan images, each scalable resolution independent vector floorplan image representing a physical space in a facility;
   maintaining access to a database that associates each of the plurality of scalable resolution independent vector floorplan images with one or more specific pieces of building management hardware of a building management system that service the physical space represented by the corresponding scalable resolution independent vector floorplan image;
   receiving building management data from the specific pieces of building management hardware via a network;
   in response to a request from a client terminal, enabling the client terminal to render one or more of the scalable resolution independent vector floorplan images at a desired position and resolution on the display;
   wherein the rendered one or more of the scalable resolution independent vector floorplan images define a heat map and include one or more graphical characteristics defined based on a gradient of color and/or pattern and/or opacity that are determined by reference to the building management data received from the respective associated specific pieces of building management hardware that service the physical space represented by the rendered one or more of the scalable resolution independent vector floorplan images such that the building management data is bound to the graphical characteristics of the rendered one or more of the scalable resolution independent vector floorplan images to enable real time application of the building management data to the rendered one or more of the scalable resolution independent vector floorplan images;
   displaying a time bar and video control on the display;
   accepting a user input via the video control to define a historical time range;
   creating a video clip that captures historical states of the one or more of the scalable resolution independent vector floorplan images over the user selected historical time range, wherein the one or more of the scalable resolution independent vector floorplan images include the heat map and the one or more graphical characteristics defined based on the gradient of color and/or pattern and/or opacity that are determined by reference to the building management data received from the respective associated specific pieces of building management hardware that service the physical space represented by the rendered one or more of the scalable resolution independent vector floorplan images;
   exporting the video clip as a video file; and enabling the exported video file to be shared with one or more users.

2. The method according to claim 1 wherein the user input accepted via the video control includes a sample rate of the video clip.

3. The method according to claim 1 wherein, for a given rendered scalable resolution independent vector floorplan image, the one or more graphical characteristics are determined by reference to a relationship between: (i) a measured temperature value at the represented physical space; and (ii) a defined temperature setpoint value defined for the represented physical space.

4. The method according to claim 1 wherein, for a given rendered scalable resolution independent vector floorplan image, the one or more graphical characteristics include a fill for at least part of the rendered scalable resolution independent vector floorplan image.

5. The method according to claim 4 wherein the fill is characterized by the gradient of color and/or pattern and/or opacity.

6. The method according to claim 1 wherein rendering the one or more of the scalable resolution independent vector floorplan images including one or more graphical characteristics that are determined by reference to the building management data received from the respective associated specific pieces of building management hardware that service the physical space represented by the rendered one or more of the scalable resolution independent vector floorplan images includes binding the client terminal and a remote data source that provides data indicative of instructions to modify the one or more graphical characteristics of the rendered one or more of the scalable resolution independent vector floorplan images.

7. The method according to claim 1 wherein rendering the one or more of the scalable resolution independent vector floorplan images including one or more graphical characteristics that are determined by reference to the building management data received from the respective associated specific pieces of building management hardware that service the physical space represented by the rendered one or more of the scalable resolution independent vector floorplan images includes instructing the client terminal to modify the graphical characteristics of the rendered one or more of the scalable resolution independent vector floorplan images in response to changes in the building management data received from the respective associated specific pieces of building management hardware that service the physical space represented by the rendered one or more of the scalable resolution independent vector floorplan images.

8. A computer implemented method for displaying facility information, the method including:
causing a client terminal to render on-screen a floorplan of at least part of a facility;
associating specific pieces of building management hardware of a building management system with corresponding parts of the floorplan;
receiving over time building management data from the specific pieces of building management hardware;
applying graphical characteristics including one or more of a gradient of color and/or a pattern and/or an opacity to the corresponding parts of the floorplan to define a heat map for the floorplan that is based on the received building management data, wherein the graphical characteristics that are applied to the corresponding parts of the floorplan are defined by a predefined relationship between the building management data received from the specific pieces of building management hardware and the graphical characteristics that are applied to the corresponding parts of the floorplan;
accepting a user input via a user control to define a historical time range;
creating a video clip that captures historical states of the floorplan over the user selected historical time range;
exporting the video clip as a video file; and
enabling the exported video file to be played by one or more users of a second client terminal.

9. The method according to claim 8 wherein at least some of the graphical characteristics are determined by reference to a relationship between: (i) a measured temperature value; and (ii) a defined temperature setpoint value for the corresponding part of the floor plan.

10. The method according to claim 8 wherein the graphical characteristics include a fill for at least part of the floorplan.

11. The method according to claim 10 wherein the fill is characterized by the gradient of color and/or pattern and/or opacity.

12. A system for displaying facility information, the system including:
an input;
an output;
a memory;
a user interface;
a controller operatively coupled to the input, the output, the user interface and the memory, the controller configured to:
receive over time via the input building management data from one or more components of a building management system;
apply predetermined graphical characteristics to a floorplan of at least part of facility to define a heat map for the floorplan, wherein the predetermined graphical characteristics are based on the received building management data;
accept via the user interface a user input to define a user selected historical time range;
create a video clip that captures historical states of the floorplan over the user selected historical time range, wherein the floorplan includes the heat map and the one or more graphical characteristics defined based on the building management data; and
export the video clip as a video file via the output so that the exported video file can be accessed and played by one or more other users.

13. The system of claim 12, wherein the controller is configured to display a time bar and video control via the user interface, and wherein the controller is configured to accept the user input to define the user selected historical time range using the video control.

14. The system of claim 12, wherein the user interface is part of a first client terminal, and wherein the exported video file can be accessed and played at a second client terminal.

15. The system of claim 12, wherein the video file is exported to a server, and wherein the exported video file can be accessed and played by one or more other users via a link to the video file on the server.

* * * * *